United States Patent
Hirokami et al.

(10) Patent No.: US 12,024,614 B2
(45) Date of Patent: Jul. 2, 2024

(54) RUBBER COMPOUNDING INGREDIENT AND RUBBER COMPOSITION

(71) Applicant: Shin-Etsu Chemical Co., Ltd., Tokyo (JP)

(72) Inventors: Munenao Hirokami, Annaka (JP); Tsuneo Kimura, Annaka (JP); Masahiko Minemura, Annaka (JP); Tsutomu Nakamura, Tokyo (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/938,998

(22) Filed: Sep. 7, 2022

(65) Prior Publication Data
US 2023/0096343 A1   Mar. 30, 2023

(30) Foreign Application Priority Data

Sep. 21, 2021  (JP) ................................. 2021-153193

(51) Int. Cl.
*C08K 5/5455*   (2006.01)
*C08K 5/548*   (2006.01)

(52) U.S. Cl.
CPC ............ *C08K 5/5455* (2013.01); *C08K 5/548* (2013.01)

(58) Field of Classification Search
CPC ........ C08K 5/5455; C08K 5/548; C08K 3/04; C08K 3/36; C08K 5/09; C08K 5/18; C08K 3/22; C08K 5/47; C08K 3/06; C08L 7/00; C08L 91/06; C08L 57/02; C08L 21/00; B60C 1/00; B60C 1/0016; Y02T 10/86
See application file for complete search history.

(56) References Cited

U.S. PATENT DOCUMENTS

| | | | |
|---|---|---|---|
| 6,229,036 B1 | 5/2001 | Batz-Sohn et al. | |
| 7,217,751 B2 | 5/2007 | Durel et al. | |

FOREIGN PATENT DOCUMENTS

| | | |
|---|---|---|
| EP | 1375504 B1 | 9/2006 |
| EP | 3 214 135 A1 | 9/2017 |
| EP | 3 785 904 A1 | 3/2021 |
| JP | 2000-103795 A | 4/2000 |
| JP | 2002-145890 A | 5/2002 |
| JP | 2004-18511 A | 1/2004 |
| JP | 2004-525230 A | 8/2004 |
| JP | 2012177027 A * | 9/2012 |
| JP | 2019-131649 A | 8/2019 |

OTHER PUBLICATIONS

English machine translation of JP 2012-177027 (Year: 2012).*
Extended European Search Report for corresponding European Application No. 22194036.4, dated Jan. 18, 2023.
Gelest et al., "Silane Coupling Agents," Gelest, Inc., Jan. 1, 2006, pp. 1-56 (60 pages total), retrieved from http://www.gelest.de/goods/pdf/couplingagents.pdf.

* cited by examiner

*Primary Examiner* — Angela C Scott
(74) *Attorney, Agent, or Firm* — Birch, Stewart, Kolasch & Birch, LLP

(57) ABSTRACT

A rubber compounding ingredient containing (A) a compound having a blocked isocyanate group and a hydrolyzable silyl group, such as an organosilicon compound having the following formula (1):

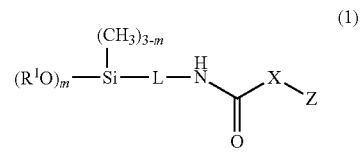

wherein $R^1$ is each independently an alkyl group having 1 to 8 carbon atoms, L is a divalent linking group, X is —O— or —$NR^2$—, Z is a hydrogen atom or a monovalent organic group, $R^2$ is a hydrogen atom, an alkyl group having 1 to 8 carbon atoms, or a group capable of bonding to Z to form a ring structure, and m is an integer of 1 to 3.

15 Claims, No Drawings

RUBBER COMPOUNDING INGREDIENT AND RUBBER COMPOSITION

CROSS-REFERENCE TO RELATED APPLICATION

This non-provisional application claims priority under 35 U.S.C. § 119(a) on Patent Application No. 2021-153193 filed in Japan on Sep. 21, 2021, the entire contents of which are hereby incorporated by reference.

TECHNICAL FIELD

This invention relates to a rubber compounding ingredient containing an organosilicon compound, and to a rubber composition.

BACKGROUND ART

Silica-filled tires show excellent performance in the automotive application, especially excellent wear resistance, rolling resistance, and wet grip. Since these performance improvements are closely related to a saving of fuel consumption of tires, active efforts are currently devoted to the industry of tires for passenger cars using solution-polymerized styrene-butadiene rubber (S-SBR).

The silica-filled rubber compositions are effective for reducing rolling resistance and improving wet grip of tires, but have a high unvulcanized viscosity and require multi-stage milling, giving rise to a problem in terms of working.

Therefore, rubber compositions simply loaded with inorganic fillers like silica suffer from problems like poor dispersion of the filler and substantial drops of rupture strength and wear resistance. Sulfur-containing organosilicon compounds are thus essentially used for the purposes of improving the dispersion of the inorganic filler in the rubber and for establishing chemical bonds between the filler and the rubber matrix.

As the sulfur-containing organosilicon compound to be used as a rubber compounding ingredient, compounds containing an alkoxysilyl group and a polysulfidesilyl group in the molecule, for example, bis(triethoxysilylpropyl)tetrasulfide and bis(triethoxysilylpropyl)disulfide are known effective (see Patent Documents 1 to 4).

A high load-bearing tire mounted on a truck or bus is required to have high rupture resistance to be able to withstand use under severe conditions, and natural rubber is used as rubber. However, there is an increasing demand for improvement in low fuel consumption and rupture resistance even in such a tire. (Patent Document 5).

CITATION LIST

Patent Document 1: JP-A 2004-525230
Patent Document 2: JP-A 2004-18511
Patent Document 3: JP-A 2002-145890
Patent Document 4: JP-A 2000-103795
Patent Document 5: JP-A 2019-131649

SUMMARY OF INVENTION

An object of the invention is to provide a rubber compounding ingredient containing an organosilicon compound which gives a rubber composition, when added thereto, capable of achieving desired low fuel consumption performance and rupture resistance performance while maintaining processability of the composition and hardness and tensile properties of a cured product thereof. Other objects are to provide a rubber composition obtained by blending the rubber compounding ingredient, and a tire formed from the rubber composition.

The inventors have found that a specific organosilicon compound having a blocked isocyanate group and a hydrolyzable silyl group is suitable as a rubber compounding ingredient, and that a tire obtained from a rubber composition containing the above rubber compounding ingredient can realize desired low fuel consumption performance and ware resistance performance while maintaining hardness and tensile properties.

In one aspect, the invention provides a rubber compounding ingredient containing (A) a compound having a blocked isocyanate group and a hydrolyzable silyl group.

In a preferred embodiment, component (A) is an organosilicon compound having the following formula (1):

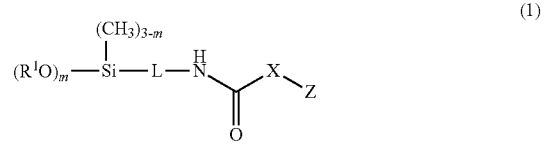

wherein $R^1$ is each independently an alkyl group having 1 to 8 carbon atoms, L is a divalent linking group, X is —O— or —$NR^2$—, Z is a hydrogen atom or a monovalent organic group, $R^2$ is a hydrogen atom, an alkyl group having 1 to 8 carbon atoms, or a group capable of bonding to Z to form a ring structure, and m is an integer of 1 to 3.

Component (A) is preferably an organosilicon compound having the following formula (2):

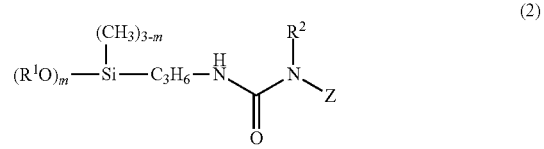

wherein $R^1$, $R^2$, Z and m are as defined above.

The rubber compounding ingredient may further contain (B) an organosilicon compound having one or more selected from a polysulfide group, a thioester group and a mercapto group, and an alkoxysilyl group.

In another aspect, the invention provides a rubber composition containing the rubber compounding ingredient defined above.

The rubber composition may further contains (C) a diene rubber and (D) a filler.

In a further aspect, the invention provides a tire obtained by molding the rubber composition defined above.

Advantageous Effects of Invention

The rubber composition blended with the rubber compounding ingredient of the invention is excellent in processability. A tire formed using this rubber composition can satisfy desired low fuel consumption tire characteristics and ware resistance performance while maintaining hardness and tensile properties.

DESCRIPTION OF THE PREFERRED EMBODIMENT

Now the invention is described in detail.

Rubber Compounding Ingredient

The rubber compounding ingredient of the invention contains the following component (A).

[1] Component (A)

Component (A) is a compound having a blocked isocyanate group and a hydrolyzable silyl group. More particularly, component (A) is a compound having a blocked isocyanate group containing a latent isocyanate group in which an isocyanate group is blocked by a blocking agent and a hydrolyzable silyl group such as a trimethoxysilyl group or a triethoxysilyl group.

Component (A) is preferably an organosilicon compound having the following formula (1).

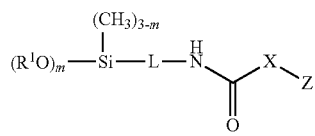

In formula (1), $R^1$ is each independently an alkyl group having 1 to 8 carbon atoms, preferably 1 to 6 carbon atoms, L is a divalent linking group, X is —O— or —$NR^2$—, Z is a hydrogen atom or a monovalent organic group, $R^2$ is a hydrogen atom, an alkyl group having 1 to 8 carbon atoms, or a group capable of bonding to Z to form a ring structure, and m is an integer of 1 to 3, preferably 3.

The alkyl group having 1 to 8 carbon atoms represented by $R^1$ may be linear, branched, or cyclic, and examples thereof include methyl, ethyl, n-propyl, isopropyl, n-butyl, isobutyl, tert-butyl, n-pentyl, neopentyl, n-hexyl, cyclohexyl, n-heptyl, and n-octyl groups. Among others, $R^1$ is preferably an alkyl group having 1 to 3 carbon atoms, more preferably methyl or ethyl group.

Examples of the divalent linking group represented by L include alkylene groups, —O—, —S—, —NR—, —C(=O)—, —C(=O)—O—, —NRCO—, —$SO_2$—, and combinations thereof. Here, R is a hydrogen atom or an alkyl group having 1 to 4 carbon atoms, with a hydrogen atom being preferred. Examples of the alkyl group include those having 1 to 4 carbon atoms among the alkyl groups exemplified above.

Among others, the divalent linking group of L is preferably an alkylene group represented by —$(CH_2)_n$— is an integer of 1 to 10, preferably 1 to 6, more preferably 1 to 4.) or a group in which one or more methylene units of —$(CH_2)_n$— are substituted with —O—, —S—, —NH—, —C(=O)—, and —C(=O)O—, and more preferably —$(CH_2)_3$— (trimethylene), as viewed from the aspect of availability of raw materials when producing an organosilicon compound.

X in formula (1) is —O— or —NR—, but is not particularly limited since it is a group that forms a part of the protecting group of the blocked isocyanate silane compound and is desorbed by heating.

In —$NR^2$— of X, R is a hydrogen atom, an alkyl group having 1 to 8 carbon atoms, or a group capable of bonding to Z to form a ring structure.

Examples of the alkyl group having 1 to 8 carbon atoms represented by $R^2$ include the same groups as those exemplified above for $R^1$. Among others, $R^2$ is preferably a linear or branched alkyl group having 1 to 5 carbon atoms, and more preferably methyl or ethyl group.

In —NR—, when $R^2$ is a group capable of bonding to Z to form a ring structure. —$NR^2$— is preferably the one which forms a heterocyclic structure with X in formula (1). The hetero atom in such a heterocyclic structure preferably contains two or more nitrogen atoms, and more preferably contains two nitrogen atoms. The heterocyclic ring preferably has a 5-membered ring or 6-membered ring structure, more preferably a 5-membered ring structure.

Z in formula 1 is a hydrogen atom or a monovalent organic group, but is not particularly limited since it is a group that forms a part of the protecting group of the blocked isocyanate silane compound, which is desorbed by heating.

Examples of the monovalent organic group represented by Z include monovalent hydrocarbon groups having 1 to 20 carbon atoms, a hydroxyl group (except when X is —O—.), and —N=$R^5$ ($R^5$ is an alkylidene group having 1 to 10 carbon atoms which may be substituted with aryl or heteroaryl group having 6 to 20 carbon atoms.), which may have a substituent and may contain an ether bond or an ester bond (exclusive of a group containing O at the end point of attachment to an oxygen atom to form a —O—O— linkage).

The monovalent hydrocarbon group having 1 to 20 carbon atoms may be linear, branched, or cyclic, and examples thereof include alkyl groups having 1 to 20 carbon atoms, aryl groups having 6 to 20 carbon atoms, and aralkyl groups having 7 to 20 carbon atoms.

Examples of the alkyl group include n-nonyl, n-decyl, n-undecyl, n-dodecyl, n-tridecyl, and n-icosyl groups, in addition to the groups exemplified for $R^1$.

Examples of the aryl group include phenyl and naphthyl groups.

Examples of the aralkyl group include benzyl and phenylethyl groups.

Also included are the foregoing groups in which at least some of hydrogen atoms are substituted with other substituents. Examples of other substituents include a carboxyl group, a hydroxyl group, an oxo group (=O), and a thioxo group (=S).

In formula —N=$R^5$, the alkylidene group having 1 to 10 carbon atoms represented by $R^5$, which may be substituted with aryl or heteroaryl group having 6 to 20 carbon atoms, may be linear, branched, or cyclic, and examples thereof include methylidene, ethylidene, propylidene, propan-2-ylidene, butylidene, butan-2-ylidene, pentylidene, 4-methylpentan-2-ylidene, hexylidene, cyclohexylidene, heptylidene, octylidene, nonylidene, and decylidene groups.

Examples of the aryl group having 6 to 20 carbon atoms include the same groups as those exemplified for the above monovalent hydrocarbon group.

Examples of the heteroaryl group having 6 to 20 carbon atoms include pyrrol-1-yl, 1H-pyrrol-2-yl, imidazol-1-yl, imidazol-2-yl, pyrazol-1-yl, pyrazol-3-yl, pyridin-2-yl, and pyridin-3-yl groups.

Examples of the substituted alkylidene group include phenylmethylidene and diphenylmethylidene groups.

Component (A) is more preferably the one having the following formula (2):

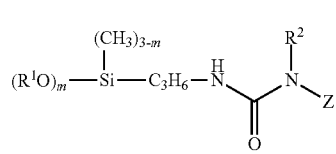

wherein $R^1$, $R^2$, Z and in are as defined above.

Examples of $R^2$ and Z are the same as described above. Among others, $R^2$ and Z are preferably bonded to each other to form a ring structure together with a nitrogen atom to which $R^2$ and Z are bonded. Examples of the ring structure includes an imidazole ring, a pyrazole ring, a 1,2,3-triazole ring, and a 1,2,4-triazole ring. Among others, a pyrazole ring is preferred.

The ring structure may have a substituent such as an alkyl group having 1 to 20 carbon atoms, an aryl group having 6 to 20 carbon atoms, an aralkyl group having 7 to 20 carbon atoms, a carboxyl group, a hydroxyl group, an ester group, an oxo group (=O), a halogen group such as chlorine or bromine, or a nitro group.

Suitable examples of the ring structure are illustrated below, but not limited thereto

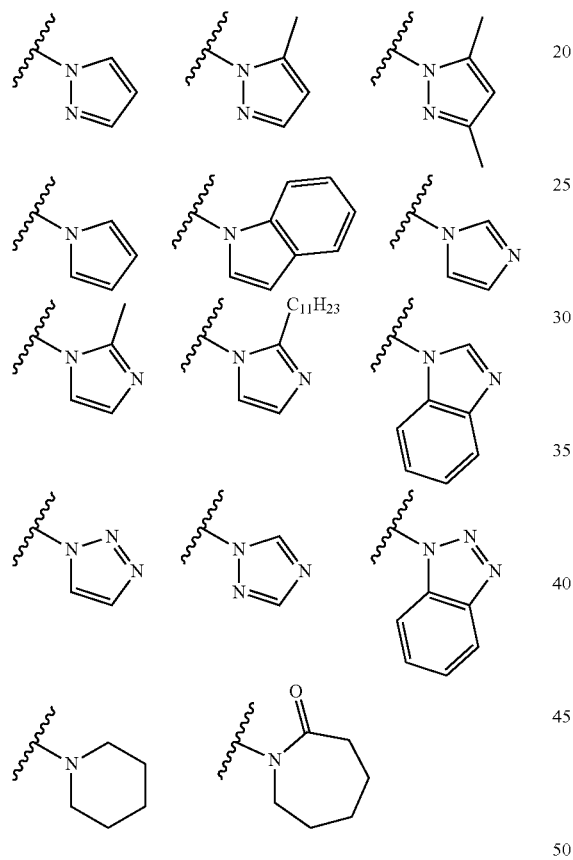

Herein a wavy line designates a bonding site.

Preferred examples of component (A) are illustrated below, but not limited thereto. Component (A) may be used alone or in combination of two or more

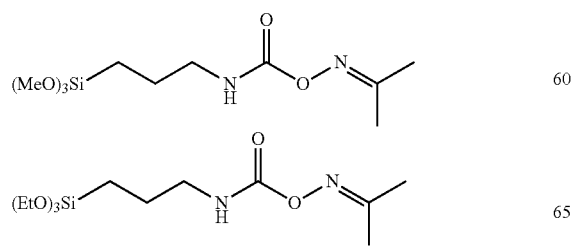

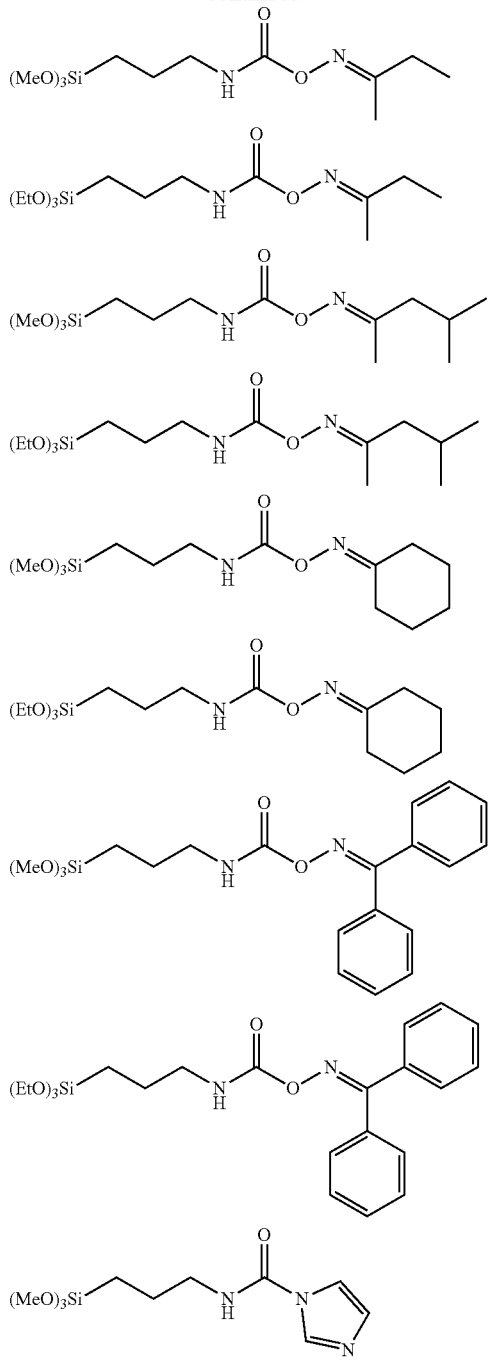

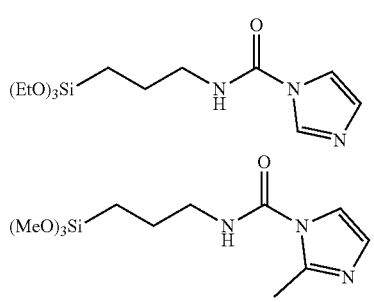

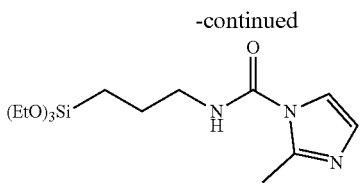
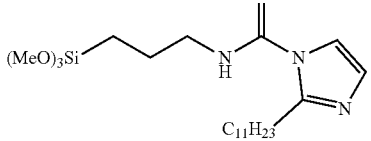
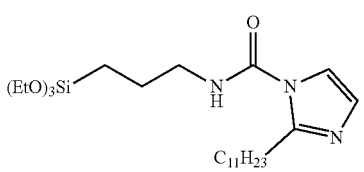
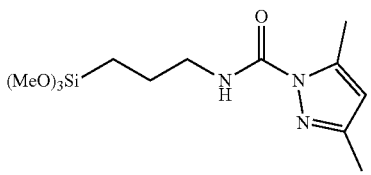
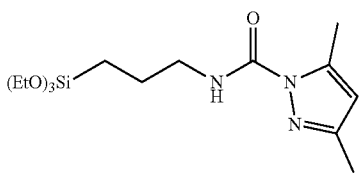
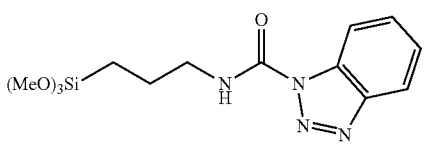
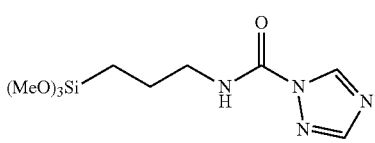
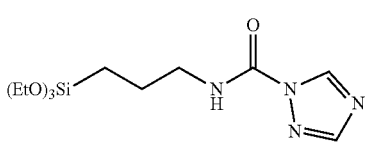
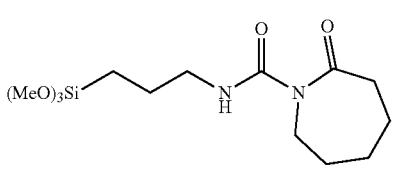

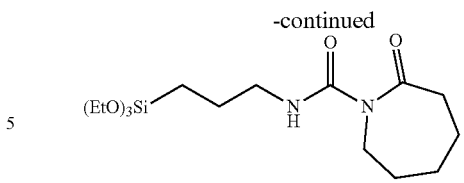

Herein Me is methyl and Et is ethyl.

The method for producing component (A) is not particularly limited, but a method for reacting a compound having an isocyanate group and a hydrolyzable silyl group in one molecule with a blocking agent is preferred.

As the compound having an isocyanate group and a hydrolyzable silyl group in one molecule, for example, a compound having the following formula (3) can be used.

(3)

Herein $R^1$, L and m are as defined above.

Examples of the compound represented by formula (3) include 1-isocyanate-methyltrimethoxysilane, 1-isocyanate-methyltriethoxysilane, 3-isocyanatepropyltrimethoxysilane, 3-isocyanatepropyltriethoxysilane, 3-isocyanatepropylmethyldimethoxysilane, 3-isocyanatepropylmethyldiethoxysilane, 6-isocyanatehexyltrimethoxysilane, 6-isocyanatehexyltriethoxysilane, 8-isocyanateoctyltrimethoxysilane, and 8-isocyanateoctyltriethoxysilane.

As the blocking agent, any conventionally known blocking agent can be used, and for example, a blocking agent having the following formula (4) can be used.

(4)

Herein X and Z are as defined above.

Examples of the compound represented by formula (4) include oxime compounds such as acetone oxime, methyl ethyl ketoxime, methyl isobutyl ketone oxine, cyclohexanone oxime, and benzophenone oxime; phenolic compounds such as phenol, p-tert-butylphenol, and cresol; alcohol compounds such as n-butanol, 2-ethylhexanol, phenyl carbinol, methylphenyl carbinol, ethylene glycol monomethyl ether, ethylene glycol monoethyl ether, ethylene glycol, ethylene glycol monobutyl ether, diethylene glycol monoethyl ether, propylene glycol, propylene glycol monomethyl ether, and methoxymethanol; lactam compounds such as ε-caprolactam and γ-butyrolactam; pyrrole compounds such as pyrrole, 2H-pyrrole, 1-methylpyrrole, 2,4-dimethylpyrrole, 2,5-dimethylpyrrole, and N-methylpyrrole; indole compounds such as indole, N-methylindole, and 2-methylindole; pyrazole compounds such as pyrazole, 3-methylpyrazole, 3,5-dimethylpyrazole, 4-bromo-3,5-dimethylpyrazole, 4-nitro-3,5-dimethylpyrazole, 4-benzyl-3,5-dimethylpyrazole, methyl-5-methylpyrazole-3-carboxylate, 3-methyl-5-phenylpyrazole, and 3,5-dimethylpyrazole-4-carboxanilide; acid amide compounds such as acetanilide, acetanisidide, acetotoluide, acrylamide, methacrylamide, acetic acid amide, stearic acid amide, and benzamide; imide compounds such as succinimide, phthalimide, and maleimide; amine compounds such as diphenylamine, phenylnaphthylamine, xylidine, N-phenylxylidine, carbazole, aniline, naphthylamine, butylamine, dibutylamine, and butylphenylamine; imidazole compounds such as imidazole, 2-methylimidazole, 2-ethylimidazole 2-undecylimidazole, and benzimidazole; triazole compounds such as 1,2,3-triazole, 1,2,4-triazole, and 1,2,3-benzotriazole; piperidine compounds such as piperidine, N-methylpiperidine, and 4-methylpiperidine; urea compounds such as urea, thiourea, ethylene urea, ethylene thiourea, and diphenyl urea; carbamic acid ester compounds such as phenyl N-phenylcarbamate; and imine compounds such as ethyleneimine and propyleneimine.

In addition to the above compounds, active methylene compounds such as dimethyl malonate, diethyl malonate, diisopropyl malonate, ethyl acetoacetate, isopropyl acetoacetate, methyl acetoacetate, isopropyl acetoacetate, and acetylacetone; mercaptan compounds such as n-butyl mercaptan, tert-butyl mercaptan, n-hexyl mercaptan, tert-dodecyl mercaptan, 2-mercaptobenzothiazole, thiophenol, methylthiophenol, and ethylthiophenol; and sulfite compounds such as sodium bisulfite and potassium bisulfite can also be used.

These compounds may be used alone or in combination of two or more. Among others, lactam compounds, pyrazole compounds, pyrrole compounds, indole compounds, imidazole compounds, triazole compounds, and piperidine compounds are preferred, with the following compounds being more preferred.

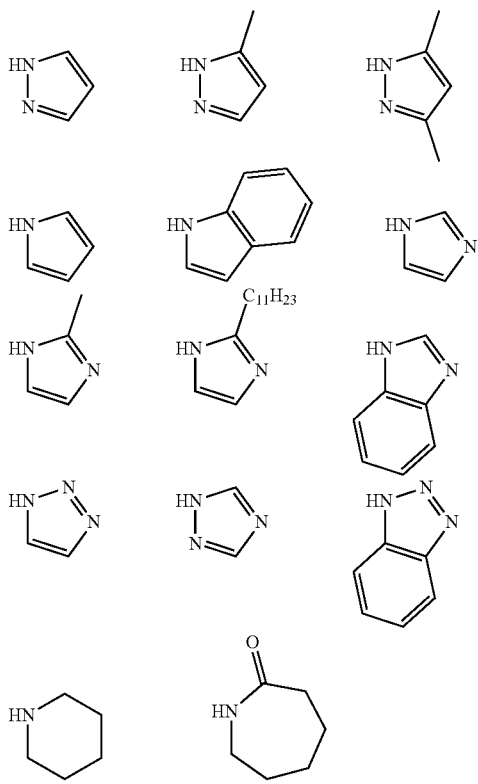

In the reaction between the compound having an isocyanate group and a hydrolyzable silyl group in one molecule and the blocking agent, the blocking agent is preferably used in an amount of 0.1 to 5 mol, more preferably 0.5 to 3 mol per 1 mol of the compound having an isocyanate group and a hydrolyzable silyl group in one molecule in the air or in an inert gas atmosphere such as nitrogen or argon.

The reaction temperature is not particularly limited, but is preferably 50 to 150° C., more preferably 60 to 120° C. The reaction time is also not particularly limited, but is preferably 1 to 10 hours, more preferably 2 to 6 hours.

[2] Component (B)

In addition to component (A), (B) an organosilicon compound having one or more selected from a polysulfide group, a thioester group and a mercapto group, and an alkoxysilyl group can be used in the rubber compounding ingredient of the invention.

Component (B) is not particularly limited as long as it is a compound having such functional groups. For example, any conventional silane coupling agent blended in a rubber composition for applications such as tires can be used.

Examples of the silane coupling agent include polysulfide organosilicon compounds such as bis-(3-bistriethoxysilylpropyl)-tetrasulfide and bis-(3-bistriethoxysilylpropyl)-disulfide; mercapto organosilicon compounds such as 3-mercaptopropyltrimethoxysilane and 3-mercaptopropyltriethoxysilane; and thioester organosilicon compounds such as 3-octanoylthiopropyltriethoxysilane and 3-propionylthiopropyltrimethoxysilane.

In addition, reaction products of the organosilicon compound having a sulfur atom and an alcohol containing a polyether group, hydrolysis condensation products of these organosilicon compounds, co-hydrolysis condensation products of these organosilicon compounds and other organosilicon compounds having an alkoxysilyl group can be used.

Component (B) may be used alone or in combination of two or more.

When component (B) is blended in the rubber compounding ingredient of the invention, the compounding ratio of components (A) and (B) is not particularly limited, but (B)/(A) in a weight ratio is preferably 10/90 to 95/5, more preferably 50/50 to 95/5.

At least one powder may be added to the rubber compounding ingredient of the invention.

Examples of the powder include carbon black, talc, calcium carbonate, stearic acid, silica, aluminum hydroxide, alumina, and magnesium hydroxide.

Among others, silica and aluminum hydroxide are preferred, and silica is more preferred in view of reinforcing properties.

When the powder is blended, in view of ease of handling and transportation cost of the rubber compounding ingredient, (X) an amount of component (A) or a total amount of components (A) and (B) to (Y) a total amount of the powder is preferably in a weight ratio ((X)/(Y)) of 70/30 to 5/95, more preferably 60/40 to 10/90.

The rubber compounding ingredient of the invention may be mixed with an organic polymer such as fatty acids, fatty acid salts, polyethylene, polypropylene, polyoxyalkylene, polyester, polyurethane, polystyrene, polybutadiene, polyisoprene, natural rubber, and styrene-butadiene copolymers, or a rubber. The rubber compounding ingredient of the invention may be blended with various additives commonly used for tires and for other general rubbers, such as vulcanizing agents, crosslinking agents, vulcanization accelerators, crosslinking accelerators, various oils, antiaging agents, fillers or plasticizers.

The rubber compounding ingredient may take the form of liquid or solid, or be diluted with organic solvents or emulsified.

Rubber Composition

The rubber composition of the invention contains the rubber compounding ingredient described above. The rubber composition preferably contains component (A) or components (A) and (B) described above, and further contains (C) a diene rubber and (D) a filler.

The amount of component (A) or components (A) and (B) combined in the rubber composition of the invention is preferably 3 to 30 parts by weight, more preferably 5 to 20 parts by weight, per 100 parts by weight of component (D) to be described in detail later, in view of rubber physical properties, the extent of available effects, and a balance thereof with economy.

[3] Component (C)

As the diene rubber (C), any of rubbers commonly used in conventional rubber compositions may be used. Examples include various isoprene rubbers (IR) such as natural rubber, and diene rubbers such as various styrene-butadiene copolymer rubbers (SBR), various polybutadiene rubbers (BR), and acrylonitrile-butadiene copolymer rubbers (NBR) These diene rubbers may be used alone or in combination of two or more.

In particular, component (C) preferably contains natural rubber. The amount of the natural rubber in component (C) is preferably 50% by weight or more, more preferably 70 to 100% by weight, in view of obtaining sufficient rupture resistance even when the composition is used for tires for high load vehicles.

As the natural rubber, any of rubbers commonly used in the tire industry such as RSS #3, SIR20, or TSR20 can be used. In addition, modified natural rubber such as epoxidized natural rubber, hydrogenated natural rubber, grafted natural rubber or deproteinized natural rubber also can be used.

Along with the diene rubber, non-diene rubber such as butyl rubber (IIR) and ethylene-propylene copolymer rubber (EPR, EPDM) may be used.

[4] Component (D)

Examples of the filler as component (D) include fillers generally used in the tire industry such as silica, carbon black, aluminum hydroxide, alumina (aluminum oxide), calcium carbonate, talc, and clay. These fillers may be used alone or in combination of two or more.

Among others, the filler preferably contains silica and carbon black, and more preferably contains only silica and carbon black.

Examples of the carbon black include those commonly used in the tire industry such as GPF, FEF, HAF, ISAF, and SAF.

Examples of the silica include those commonly used in the tire industry, such as silica prepared by a dry method (anhydrous silica) and silica prepared by a wet method (hydrous silica). Among others, silica prepared by a wet method is preferred because it contains many silanol groups.

In particular, the silica preferably has a nitrogen adsorption specific surface area ($N_2SA$) of 70 $m^2/g$ or more, more preferably 100 $m^2/g$ or more. The upper limit of $N_2SA$ is not particularly limited, but is preferably 500 $m^2/g$ or less, more preferably 400 $m^2/g$ or less in view of ease of handling.

When component (D) is blended in the rubber composition of the invention, the amount thereof is preferably 5 to 200 parts by weight, more preferably 10 to 150 parts by weight, still more preferably 20 to 130 parts by weight, per 100 parts by weight of component (C), in view of dispersibility, low fuel consumption, and molding processability. When the powder is contained in the rubber compounding ingredient, the amount is a total amount of the powder.

In addition to components (A) to (D), the rubber composition of the invention may have blended therein various additives which are generally blended in tires and other rubbers, for example, sulfur, crosslinking agents, vulcanization accelerators, crosslinking accelerators, various oils, antiaging agents, plasticizers, various resins, waxes, and zinc oxide. The amount of these additives can be a conventional general amount as long as the objects of the invention are not impaired.

Examples of the sulfur include powder sulfur, precipitated sulfur, colloidal sulfur, insoluble sulfur, highly dispersible sulfur, and soluble sulfur, which are generally used in the rubber industry. These ma be used alone or in combination of two or more. For example, products available from Tsurumi Chemical Industry Co., Ltd., Karuizawva Sulfur Co., Ltd., Shikoku Chemicals Corporation, Flexsys, NIPPON KANRYU INDUSTRY CO., LTD, Hosoi Chemical Industry Co., Ltd. can be used.

When the sulfur is blended, the amount thereof is preferably 0.1 parts by weight or more and 5.0 parts by weight or less, more preferably 0.3 parts by weight or more and 2.0 parts by weight or less, even more preferably 0.5 parts by weight or more and 1.5 parts by weight or less, per 100 parts by weight of component (C). Within the above range, a balance between tensile properties and ware resistance performance is good.

Rubber Article or Tire

The rubber composition of the invention may be prepared by forming the above-described components (A) to (D) and other components into a composition by a standard technique, which is ready for use in the manufacture of rubber articles to be vulcanized or crosslinked, typically tires. Especially in manufacturing tires, the rubber composition of the invention is preferably used as treads.

Since the tires obtained from the rubber composition of the invention are significantly reduced in rolling resistance and wear resistance, the desired saving of fuel consumption is achievable.

The tire may have any prior art well-known structures and be manufactured by any prior art well-known techniques. In the case of pneumatic tires, the gas introduced therein may be ordinary air, air having a controlled oxygen partial pressure, or an inert gas such as nitrogen, argon or helium.

EXAMPLES

Synthesis Examples, Examples and Comparative Examples are given below by way of illustration and not by way of limitation. In the following Examples, Me is methyl and Et is ethyl. The abbreviation "pbw" is parts by weight.

[1] Synthesis of Organosilicon Compound

Synthesis Example 1-1

A 500-mL separable flask equipped with a stirrer, a reflux condenser, a dropping funnel, and a thermometer was charged with 247 g (1.0 mol) of 3-isocyanatopropyltriethoxysilane (KBE9007N by Shin-Etsu Chemical Co., Ltd.). Then, 68 g (1.0 mol) of imidazole (Tokyo Chemical Industry Co., Ltd.) was added at 80° C., which was aged at 80° C. for 4 hours. Thereafter, the mixture was filtered to obtain an organosilicon compound (A-1) having the following formula.

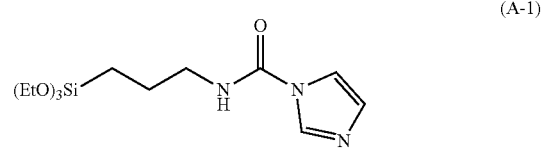

(A-1)

Synthesis Example 1-2

A 500-mL separable flask equipped with a stirrer, a reflux condenser, a dropping funnel, and a thermometer was charged with 247 g (1.0 mol) of 3-isocyanatopropyltriethoxysilane (KBE9007N by Shin-Etsu Chemical Co., Ltd.). Then, 82 g (1.0 mol) of 2-methylimidazole (Tokyo Chemical Industry Co., Ltd.) was added at 80° C., which was aged at 80° C. for 4 hours. Thereafter, the mixture was filtered to obtain an organosilicon compound (A-2) having the following formula.

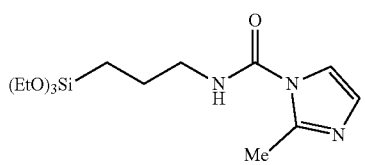
(A-2)

Synthesis Example 1-3

A 500-mL separable flask equipped with a stirrer, a reflux condenser, a dropping funnel, and a thermometer was charged with 247 g (1.0 mol) of 3-isocyanatopropyltriethoxysilane (KBE9007N by Shin-Etsu Chemical Co., Ltd.). Then, 222 g (1.0 mol) of 2-undecylimidazole (Tokyo Chemical Industry Co., Ltd.) was added at 80° C., which was aged at 80° C. for 4 hours. Thereafter, the mixture was filtered to obtain an organosilicon compound (A-3) having the following formula.

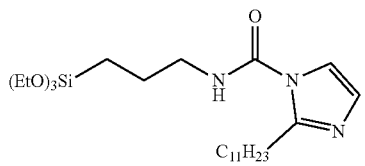
(A-3)

Synthesis Example 1-4

A 500-mL separable flask equipped with a stirrer, a reflux condenser, a dropping funnel, and a thermometer was charged with 247 g (1.0 mol) of 3-isocyanatopropyltriethoxysilane (KBE9007N by Shin-Etsu Chemical Co., Ltd.). Then, 96 g (1.0 mol) of 3, 5-dimethylpyrazole (Tokyo Chemical Industry Co., Ltd.) was added at 80° C., which was aged at 80° C. for 4 hours. Thereafter, the mixture was filtered to obtain an organosilicon compound (A-4) having the following formula.

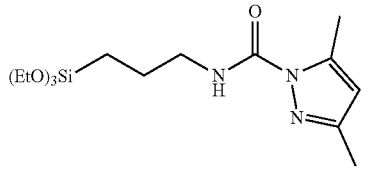
(A-4)

Synthesis Example 1-5

A 500-mL separable flask equipped with a stirrer, a reflux condenser, a dropping funnel, and a thermometer was charged with 247 g (1.0 mol) of 3-isocyanatopropyltriethoxysilane (KBE9007N by Shin-Etsu Chemical Co., Ltd.). Then, 119 g (1.0 mol) of 1,2,3-benzotriazole (Tokyo Chemical Industry Co., Ltd.) was added at 80° C., which was aged at 80° C. for 4 hours. Thereafter, the mixture was filtered to obtain an organosilicon compound (A-5) having the following formula,

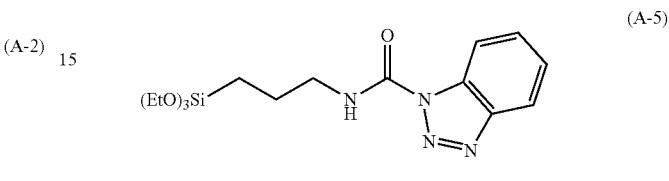
(A-5)

Synthesis Example 1-6

A 500-mL separable flask equipped with a stirrer, a reflux condenser, a dropping funnel, and a thermometer was charged with 247 g (1.0 mol) of 3-isocyanatopropyltriethoxysilane (KBE9007N by Shin-Etsu Chemical Co., Ltd.). Then, 69 g (1.0 mol) of 1,2,4-triazole (Tokyo Chemical Industry Co., Ltd.) was added at 80° C., which was aged at 80° C. for 4 hours. Thereafter, the mixture was filtered to obtain an organosilicon compound (A-6) having the following formula.

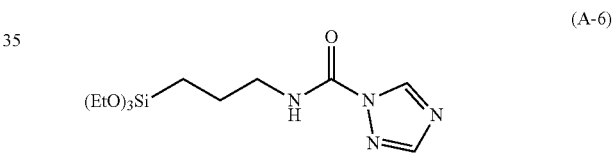
(A-6)

Synthesis Example 1-7

A 500-mL separable flask equipped with a stirrer, a reflux condenser, a dropping funnel, and a thermometer was charged with 247 g (1.0 mol) of 3-isocyanatopropyltriethoxysilane (KBE9007N by Shin-Etsu Chemical Co., Ltd.). Then, 113 g (1.0 mol) of ε-caprolactam (Tokyo Chemical Industry Co., Ltd.) was added at 80° C., which was aged at 80° C. for 4 hours. Thereafter, the mixture was filtered to obtain an organosilicon compound (A-7) having the following formula.

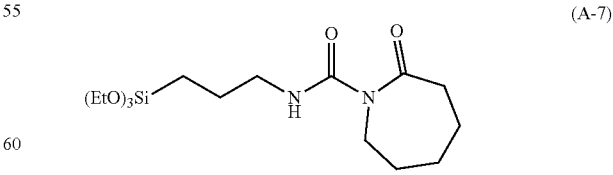
(A-7)

Synthesis Example 1-8

A 1-L, separable flask equipped with a stirrer, a reflux condenser, a dropping funnel, and a thermometer was charged with 539 g (1.0 mol) of bis(triethoxysilylpropyl) tetrasulfide (KBE-846 by Shin-Etsu Chemical Co., Ltd.), 222 g (0.8 mol) of octyltriethoxysilane (KBE-3083 by Shin-Etsu Chemical Co., Ltd.), and 200 g of ethanol. Then, 25.2 g of 0.5 N hydrochloric acid (1.4 mol of water) was added dropwise thereto at room temperature, Next, the mixture was stirred at 80° C. for 10 hours. Then, 3.0 g of propylene oxide was added dropwise thereto, and the mixture was stirred at 80° C. for 2 hours. Further, the mixture was concentrated under a reduced pressure and filtered to obtain a brown transparent liquid organopolysiloxane (B-2) having a kinematic viscosity of 80 mm²/s and having the following average composition formula.

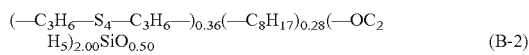

$$(-C_3H_6-S_4-C_3H_6-)_{0.36}(-C_8H_{17})_{0.28}(-OC_2H_5)_{2.00}SiO_{0.50} \quad (B-2)$$

[2] Preparation of Rubber Compounding Ingredient

Examples 1-1 to 1-9

Using a 200-mL separable flask equipped with a stirrer, components were mixed in the amounts (parts by weight) shown in Table I to obtain rubber compounding ingredients.

TABLE 1

| Formulation | Example | | | | | | | | |
|---|---|---|---|---|---|---|---|---|---|
| (pbw) | 1-1 | 1-2 | 1-3 | 1-4 | 1-5 | 1-6 | 1-7 | 1-8 | 1-9 |
| (A-1) | 30 | | | | | | | | |
| (A-2) | | 30 | | | | | | | |
| (A-3) | | | 50 | | | | | | |
| (A-4) | | | | 30 | | | | 30 | |
| (A-5) | | | | | 40 | | | | |
| (A-6) | | | | | | 30 | | | |
| (A-7) | | | | | | | 30 | | 100 |
| (B-1) | 100 | 100 | 100 | 100 | 100 | 100 | 100 | | |
| (B-2) | | | | | | | | 100 | |

(B-1): Bis(triethoxysilylpropyl)tetrasulfide (KBE-846 by Shin-Etsu Chemical Co., Ltd.)

[3] Preparation of Rubber Composition

Examples 2-1 to 2-9, Comparative Examples 2-1, 2-2

Natural rubber shown in Tables 2 and 3 was kneaded on a 4-L internal mixer (MIXTRON by Kobelco) for 60 seconds.

Next, natural rubber, carbon black, silica, the rubber compounding ingredients of Examples 1-1 to 1-9, stearic acid, an antiaging agent, resin, and wax shown in Tables 2 and 3 were added to the mix. The internal temperature was raised to 150° C., after which the mix was discharged. This was followed by stretching on a roll mill. The resulting rubber composition was kneaded again on the internal mixer (MIXTRON by Kobelco) until the internal temperature reached 145° C., discharged, and stretched on a roll mill. Rubber compositions were obtained by adding zinc oxide, vulcanization accelerator and sulfur shown in Tables 2 and 3 to the rubber and kneading them.

Natural rubber: RSS #3
Carbon black: Seast 9H (Tokai Carbon Co., Ltd.)
Silica: Nipsil AQ (Tosoh Silica Corporation)
Stearic acid: Industrial stearic acid (Kao Corporation)
Antiaging agent: Nocrac 6C (Ouchi Shinko Chemical Industry Co., Ltd.)
Resin: T-REZ RA-100 (ENEOS Co., Ltd.)
Wax: Ozoace 0355 (Nippon Seiro Co., Ltd.)
Zinc oxide: Zinc oxide No. 3 (Mitsui Mining & Smelting Co., Ltd.)
Vulcanization accelerator (a): Nocceler DM-P (Ouchi Shinko Chemical Industry Co., Ltd.)
Vulcanization accelerator (b): Nocceler CZ-G (Ouchi Shinko Chemical Industry Co., Ltd.)
Sulfur: 5% Oil-treated sulfur (Hosoi Chemical Industry Co., Ltd.)

The rubber compositions of Examples 2-1 to 2-9 and Comparative Examples 2-1 and 2-2 were measured for unvulcanized and vulcanized physical properties by the following methods. The results are also shown in Tables 2 and 3. The rubber compositions were press molded at 145° C. for 30 minutes into vulcanized rubber sheets (2 mm thick), which were measured for the vulcanized physical properties.

Unvulcanization Properties
(1) Mooney Viscosity

According to JIS K 6300-1: 2013, measurement was made under conditions: preheating 1 minute, measurement 4 minutes, and temperature 130° C. The measurement result was expressed as an index based on 100 for Comparative Example 2-1. A lower index corresponds to a lower Mooney viscosity and indicates better workability.

Vulcanization Properties
(2) Hardness

Durometer (type A) hardness was measured in accordance with JIS K 6253-3: 2012. The measurement result was expressed as an exponent as an index based on 100 for Comparative Example 2-1.

(3) Tensile Properties

A test piece was obtained by punching the sheet into a JIS No. 3 dumbbell shape. A tensile test was performed at a tensile speed of 500 mm/min in accordance with JIS K6251, and a 300% modulus ($M_{300}$) [MPa] was measured at room temperature. The measurement result was expressed as an exponent as an index based on 100 for Comparative Example 2-1. A greater exponent value indicates a higher modulus and better tensile properties.

(4) Dynamic Viscoelasticity (Strain Dispersion)

Using a viscoelasticity meter (Metravib), a storage elasticity at strain 0.5%, E' (0.5%) and a storage elasticity at strain 3.0%, E' (3.0%) were measured under conditions: temperature 25° C. and frequency 55 Hz. A value of [E' (0.5%)–E' (3.0%)] was computed. The test specimen was a sheet of 0.2 cm thick and 0.5 cm wide, the clamp span was 2 cm, and the initial load was 1 N. The value of [E' (0.5%)–E' (3.0%)] was expressed as an index based on 100 for Comparative Example 2-1. A lower index indicates better dispersion of silica.

(5) Dynamic Viscoelasticity (Temperature Dispersion)

Using a viscoelasticity meter (Metravib), measurement was made under conditions: tensile dynamic strain 1% and frequency 55 Hz. The test specimen was a sheet of 0.2 cm thick and 0.5 cm wide, the clamp span was 2 cm, and the initial load was 1 N. The values of tan δ (60° C.) were expressed as an index based on 100 for Comparative Example 2-1. A lower index of tan δ (60° C.) indicates better rolling resistance.

(6) Wear Resistance

Using a FPS tester (Ueshima Seisakusho Co., Ltd.), the test was carried out under conditions: sample speed 200 m/min, load 20 N, road temperature 30° C., slip rate 5%, and slip rate 20%. The measurement result was expressed as an index based on 100 for Comparative Example 2-1. A greater index indicates a smaller abrasion and hence, better wear resistance.

TABLE 2

| Formulation (pbw) | | 2-1 | 2-2 | 2-3 | 2-4 | 2-5 | 2-6 | 2-7 | 2-8 | 2-9 |
|---|---|---|---|---|---|---|---|---|---|---|
| Natural rubber | | 100 | 100 | 100 | 100 | 100 | 100 | 100 | 100 | 100 |
| Carbon black | | 20 | 20 | 20 | 20 | 20 | 20 | 20 | 20 | 20 |
| Silica | | 30 | 30 | 30 | 30 | 30 | 30 | 30 | 30 | 30 |
| Rubber compounding ingredient | Example 1-1 | 4 | — | — | — | — | — | — | — | — |
| | Example 1-2 | — | 4 | — | — | — | — | — | — | — |
| | Example 1-3 | — | — | 6 | — | — | — | — | — | — |
| | Example 1-4 | — | — | — | 4 | — | — | — | — | — |
| | Example 1-5 | — | — | — | — | 5 | — | — | — | — |
| | Example 1-6 | — | — | — | — | — | 4 | — | — | — |
| | Example 1-7 | — | — | — | — | — | — | 4 | — | — |
| | Example 1-8 | — | — | — | — | — | — | — | 4 | — |
| | Example 1-9 | — | — | — | — | — | — | — | — | 3 |
| Stearic acid | | 2 | 2 | 2 | 2 | 2 | 2 | 2 | 2 | 2 |
| Antiaging agent | | 2 | 2 | 2 | 2 | 2 | 2 | 2 | 2 | 2 |
| Resin | | 1 | 1 | 1 | 1 | 1 | 1 | 1 | 1 | 1 |
| Wax | | 1 | 1 | 1 | 1 | 1 | 1 | 1 | 1 | 1 |
| Zinc oxide | | 2.5 | 2.5 | 2.5 | 2.5 | 2.5 | 2.5 | 2.5 | 2.5 | 2.5 |
| Vulcanization accelerator (a) | | 0.3 | 0.3 | 0.3 | 0.3 | 0.3 | 0.3 | 0.3 | 0.3 | 0.3 |
| Vulcanization accelerator (b) | | 1.0 | 1.0 | 1.0 | 1.0 | 1.0 | 1.0 | 1.0 | 1.0 | 1.0 |
| Sulfur | | 1.0 | 1.0 | 1.0 | 1.0 | 1.0 | 1.0 | 1.0 | 1.0 | 1.5 |
| [Unvulcanization properties] | | | | | | | | | | |
| Mooney viscosity | | 102 | 102 | 102 | 103 | 102 | 103 | 102 | 103 | 105 |
| [Vulcanization properties] | | | | | | | | | | |
| Hardness | | 100 | 100 | 100 | 100 | 100 | 100 | 100 | 100 | 100 |
| Tensile properties M300 | | 100 | 100 | 100 | 100 | 100 | 100 | 100 | 100 | 100 |
| Strain dispersion [E' (0.5%)-E' (3.0%)] | | 92 | 92 | 88 | 88 | 98 | 95 | 98 | 84 | 95 |
| Dynamic viscoelasticity tan δ (60° C.) | | 92 | 92 | 87 | 87 | 97 | 96 | 99 | 83 | 95 |
| Ware resistance (Slip ratio 5%) | | 110 | 110 | 110 | 111 | 111 | 112 | 111 | 110 | 103 |
| Ware resistance (Slip ratio 20%) | | 130 | 132 | 130 | 135 | 135 | 130 | 130 | 120 | 105 |

TABLE 3

| Formulation (pbw) | Comparative Example 2-1 | Comparative Example 2-2 |
|---|---|---|
| Natural rubber | 100 | 100 |
| Carbon black | 20 | 20 |
| Silica | 30 | 30 |
| (B-1) | 3 | — |
| (B-2) | — | 3 |
| Stearic acid | 2 | 2 |
| Antiaging agent | 2 | 2 |
| Resin | 1 | 1 |
| Wax | 1 | 1 |
| Zinc oxide | 2.5 | 2.5 |
| Vulcanization accelerator (a) | 0.3 | 0.3 |
| Vulcanization accelerator (b) | 1.0 | 1.0 |
| Sulfur | 1.7 | 1.7 |
| [Unvulcanization properties] | | |
| Mooney viscosity | 100 | 100 |
| [Vulcanization properties] | | |
| Hardness | 100 | 100 |
| Tensile properties M300 | 100 | 100 |
| Strain dispersion [E' (0.5%) – E' (3.0%)] | 100 | 85 |
| Dynamic viscoelasticity tan δ (60° C.) | 100 | 85 |
| Ware resistance (Slip ratio 5%) | 100 | 96 |
| Ware resistance (Slip ratio 20%) | 100 | 96 |

As shown in Tables 2 and 3, the vulcanized rubber compositions of Examples 2-1 to 2-9 have lower dynamic viscoelasticity, than the vulcanized rubber compositions of Comparative Examples 2-1 and 2-2, while maintaining hardness and tensile properties, indicating a smaller hysteresis loss, less heat generation, and better wear resistance.

Japanese Patent Application No, 2021-153193 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A rubber compounding ingredient comprising (A) an organosilicon compound having the following formula (1):

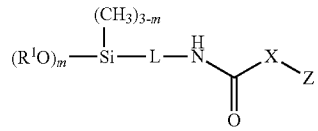

(1)

wherein $R^1$ is each independently an alkyl group having 1 to 8 carbon atoms, L is a divalent linking group, X is —O— or —NR$^2$—, Z is a monovalent organic group, $R^2$ is a hydrogen atom, an alkyl group having 1 to 8 carbon atoms, or a group capable of bonding to Z to form a ring structure, and m is an integer of 1 to 3.

2. The rubber compounding ingredient according to claim 1, wherein component (A) is an organosilicon compound having the following formula (2):

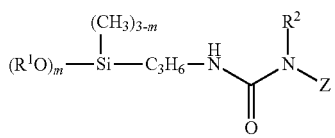
(2)

wherein R¹, R², Z and m are as defined above.

3. The rubber compounding ingredient according to claim 1, further comprising (B) an organosilicon compound having one or more selected from a polysulfide group, a thioester group and a mercapto group, and an alkoxysilyl group.

4. The compounding ingredient of claim 3, wherein a compounding ratio of components (A) and (B) expressed as (B)/(A) in a weight ratio in the rubber compounding ingredient is 10/90 to 95/5.

5. The compounding ingredient of claim 4, wherein the compounding ratio of components (A) and (B) expressed as (B)/(A) in a weight ratio in the rubber compounding ingredient is 50/50 to 95/5.

6. The rubber compounding ingredient of claim 1, wherein in formula (1), X is —O—, and Z is —N=R⁵ wherein R⁵ is an alkylidene group having 1 to 10 carbon atoms which may be substituted with aryl or heteroaryl group having 6 to 20 carbon atoms.

7. The rubber compounding ingredient of claim 1, wherein in formula (1), X is —NR²— wherein R² is a group capable of bonding to Z to form a ring structure, and R² and Z are bonded to each other to form a ring structure selected from groups having the following formulae:

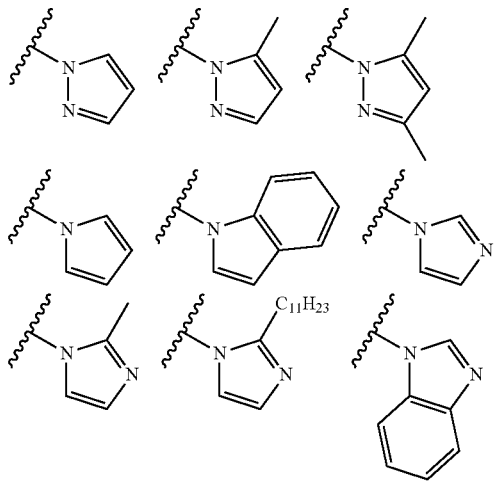

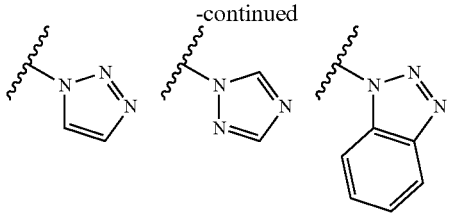

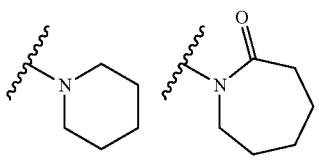

wherein a wavy line designates a bonding site.

8. The rubber compounding ingredient of claim 1, wherein the monovalent organic group is an alkyl group having 1 to 20 carbon atoms, an aryl group having 6 to 20 carbon atoms, or an aralkyl group having 7 to 20 carbon atoms.

9. A rubber composition comprising the rubber compounding ingredient according to claim 1.

10. The rubber composition according to claim 9, further comprising (C) a diene rubber and (D) a filler.

11. The rubber composition of claim 10, further comprising (B) an organosilicon compound having one or more selected from a polysulfide group, a thioester group and a mercapto group, and an alkoxysilyl group, wherein an amount of components (A) and (B) combined in the rubber composition is 3 to 30 parts by weight per 100 parts by weight of component (D).

12. The rubber composition of claim 11, wherein the amount of components (A) and (B) combined in the rubber composition is 5 to 20 parts by weight per 100 parts by weight of component (D).

13. The rubber composition of claim 10, wherein an amount of component (D) is 5 to 200 parts by weight per 100 parts by weight of component (C).

14. The rubber composition of claim 13, wherein the amount of component (D) is 10 to 150 parts by weight per 100 parts by weight of component (C).

15. A tire obtained by molding the rubber composition according to claim 9.

* * * * *